US009865486B2

(12) United States Patent
Arsovski et al.

(10) Patent No.: US 9,865,486 B2
(45) Date of Patent: Jan. 9, 2018

(54) TIMING/POWER RISK OPTIMIZED SELECTIVE VOLTAGE BINNING USING NON-LINEAR VOLTAGE SLOPE

(71) Applicant: GLOBALFOUNDRIES INC., Grand Cayman (KY)

(72) Inventors: Igor Arsovski, Williston, VT (US); Jeanne P. Bickford, Essex Junction, VT (US); Mark W. Kuemerle, Essex Junction, VT (US); Susan K. Lichtensteiger, Essex Junction, VT (US); Jeanne H. Raymond, Richmond, VT (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 0 days.

(21) Appl. No.: 15/083,692

(22) Filed: Mar. 29, 2016

(65) Prior Publication Data

US 2017/0287756 A1    Oct. 5, 2017

(51) Int. Cl.
| | |
|---|---|
| G01R 31/26 | (2014.01) |
| H01L 21/66 | (2006.01) |
| H01L 21/67 | (2006.01) |
| G06F 17/50 | (2006.01) |
| G01R 31/28 | (2006.01) |

(52) U.S. Cl.
CPC .... *H01L 21/67271* (2013.01); *G01R 31/2882* (2013.01); *G06F 17/5081* (2013.01); *H01L 21/67253* (2013.01); *H01L 22/14* (2013.01)

(58) Field of Classification Search
CPC ......... H01L 27/11521; H01L 29/42336; H01L 21/67271
See application file for complete search history.

(56) References Cited

U.S. PATENT DOCUMENTS

| | | |
|---|---|---|
| 6,121,812 A | 9/2000 | Tsukikawa |
| 7,475,366 B2 | 1/2009 | Kuemerle et al. |
| 8,421,495 B1 | 4/2013 | Anemikos et al. |
| 8,781,792 B2 | 7/2014 | Visweswariah et al. |

(Continued)

*Primary Examiner* — Zandra Smith
*Assistant Examiner* — John M Parker
(74) *Attorney, Agent, or Firm* — Gibb & Riley, LLC; David A. Cain, Esq.

(57) ABSTRACT

Systems and methods for optimizing timing/power risk SVB using a customer-supplied, non-linear voltage slope. Chips are manufactured according to an integrated circuit design. The minimum operating voltage and hardware variations for each device in the design is determined and a process distribution for the chips is divided into process windows. Vmax and Vmin to support system frequency are determined for each process window. Vmin vs. process-bin mean and sigma sensitivity is calculated using information about specific devices. The voltage for each process window that generates Vmin for specific devices is identified. Power at the slow end and fast end of each process window is evaluated using the voltage to support system frequency. Pmax is determined. Vmax for each process window that generates Pmax is determined. A voltage is identified between Vmin and Vmax that maximizes the timing margin for system frequency while minimizing risk for Pmax. The chips are sorted into different process windows, based on the voltage identified.

15 Claims, 6 Drawing Sheets

(56) References Cited

U.S. PATENT DOCUMENTS

| | | |
|---|---|---|
| 9,058,034 B2 | 6/2015 | Bickford et al. |
| 9,117,547 B2 | 8/2015 | Barth, Jr. |
| 9,152,168 B2 | 10/2015 | Bickford et al. |
| 2007/0143722 A1 | 6/2007 | Venkateswaran et al. |
| 2008/0168318 A1* | 7/2008 | DeMent ............ G01R 31/3004 714/745 |
| 2010/0180243 A1 | 7/2010 | Sinha et al. |
| 2013/0124133 A1 | 5/2013 | Anemikos et al. |
| 2014/0024145 A1 | 1/2014 | Bickford et al. |
| 2014/0074422 A1 | 3/2014 | Bickford et al. |
| 2014/0100799 A1 | 4/2014 | Bickford et al. |

* cited by examiner

TIMING/POWER RISK OPTIMIZED SELECTIVE VOLTAGE BINNING USING NON-LINEAR VOLTAGE SLOPE

BACKGROUND

The present disclosure relates to selective voltage binning (SVB) of integrated circuit (IC) chips and, more specifically, to a method for improving SVB accuracy and, thereby IC chip yield and product reliability.

Manufacturing variations may cause one or more parameters to vary between integrated circuits that are formed according to the same design. These variations can affect chip operating frequency (i.e., switching speed). For example, due to variations in the equipment, operators, position on a wafer, etc., a specific parameter may vary between chips built on the same wafer, chips built on different wafers in the same lot, and/or on chips built on different wafers in different lots. If this parameter is, for example, channel length, width, or threshold voltages, the transistors of each chip may be different such that the performance varies (e.g., faster or slower). Chips that are fabricated either at the "slow" end or the "fast" end of a process distribution (e.g., a process-temperature-variation (PVT) space) may not be desirable. For example, chips that are fabricated at the "slow" end of such a process distribution may not meet the desired performance specification (i.e., may not have a fast enough switching speed); whereas chips fabricated at the "fast" end of this process distribution may exhibit excessive power and leakage current. Thus, it is possible to run faster parts at lower voltage and slower parts at higher voltage, in order to reduce the maximum power for the distribution of parts. The division between the fast and slow portions of the distribution (i.e. the cutpoint) is generally determined during the design phase.

Selective voltage binning (SVB) is a technique that was developed in order to reduce power consumption at the "fast" end of the process distribution, while increasing operating speed at the "slow" end of the process distribution. Typically, in SVB, a full process distribution for an IC chip design at a target voltage and a target temperature for the technology at issue and with respect to a target threshold voltage (VT)-type transistor is defined prior to manufacturing (e.g., based on a best case/worst case analysis) or after manufacturing (e.g., based on actual performance measurements taken from performance monitors, such as performance screen ring oscillators (PSROs), associated with the target VT-type transistor on IC chips that are manufactured according to the IC design). It should be understood that a given IC chip design will often incorporate multiple VT-type transistors (e.g., regular threshold voltage (RVT) transistors, high threshold voltage (HVT) transistors, mezzanine threshold voltage (MVT) transistors, super-high threshold voltage (SHVT) transistors, low threshold voltage (LVT) transistors, ultra-high threshold voltage (UHVT) transistors, etc.) and the target VT-type will be one of these different VT-types (e.g., MVT). Additionally, it should be understood that the performance monitors described above can be on-chip performance monitors and/or in-Kerf performance monitors (i.e., performance monitors located in the Kerf-lines between IC chips manufactured on a semiconductor wafer).

In any case, once defined, the full process distribution is then divided into successive intervals (also referred to as process windows) and different voltage ranges are assigned to each successive interval (i.e., to each process window) such that relatively low supply voltage ranges (minimum supply voltage to maximum supply voltage) within the allowable voltage range for the technology are assigned to intervals at the "fast" end of the process distribution and relatively high voltage ranges are assigned to intervals at the "slow" end of the process distribution. Subsequently, performance measurements are taken from on-chip and/or in-Kerf performance monitors of manufactured IC chips, as discussed above and, based on these performance measurements, the IC chips are sorted into different groups (also referred to as voltage bins) that correspond to different process windows. This process of assigning the IC chips to the different groups that correspond to different process windows based on their specific performance measurements is referred to as selective voltage binning. When such IC chips are shipped for incorporation into products, the voltage ranges associated with their respective voltage bins are noted. Operation of relatively fast IC chips at lower voltage ranges minimizes worst-case power consumption and operation of relatively slow IC chips at higher voltage ranges improves their performance (e.g., increases their operating speed/reduces their delay). Recently, it has been noted that some IC chips throughout the process window distribution fail to meet the performance required for their assigned voltage bin when operated near the minimum voltage allowed for that bin.

SUMMARY

Due to mismatch between process-monitors and critical-timing circuits conventional selective voltage binning (SVB) timing/test approach can cause Vmin fallout. Timing and testing close to the performance limit exposes performance monitor inaccuracies. Any mismatch in SVB bin definition can result in Vmin yield loss. Optimization of the margin through the timing window will allow for additional timing margin at the nominal process (where most of the hardware is processed, while minimizing the impacts at the fast end and the slow end of each bin, which are the typical power and timing limiters). This approach decreases power for a given performance and maximizes nominal process timing margin. The voltage margin ensures that all VT types meet the max and min delay.

In view of the foregoing, disclosed herein is a method for optimizing timing/power risk selective voltage binning using a customer-supplied, non-linear voltage slope. Chips are manufactured according to an integrated circuit design. The minimum operating voltage and hardware variations for each device in the integrated circuit design are determined and a process distribution for the chips is divided into process windows. Each process window is associated with a corresponding performance range. Maximum voltage (Vmax) and minimum voltage (Vmin) to support a system frequency (Fsys) is determined for each process window. All the devices on each chip are identified and Vmin vs. process-bin mean and sigma sensitivity is calculated using information about specific integrated circuit devices. The voltage for each process window that generates the minimum voltage for the specific integrated circuit devices is identified. Power at the slow end and fast end of each process window is evaluated using the voltage necessary to support the system frequency. The highest power (Pmax) is determined. The maximum voltage for each process window that generates the highest power is determined. A voltage is identified between the minimum voltage and the maximum voltage that maximizes the timing margin for the system frequency while minimizing the risk for the highest power.

The chips are sorted into different process windows, based on the voltage identified between the minimum voltage and the maximum voltage.

Also disclosed herein is a method for optimizing selective voltage binning (SVB). In the method, integrated circuit devices are manufactured according to an integrated circuit design, using manufacturing equipment. The integrated circuit design produces integrated circuit devices that are identically designed and perform at different operating speeds caused by manufacturing process variations. The minimum operating voltage and hardware variations for each device in the integrated circuit design are determined and a process distribution for the chips is divided into process windows. Each process window is associated with a corresponding performance range and minimum voltage. For each integrated circuit device in each of the process windows, bin-specific voltage limits for each supply voltage are established, based on the integrated circuit design for each process window. The bin-specific voltage limits are a maximum voltage (Vmax) and minimum voltage (Vmin) to support performance at system frequency (Fsys) for the integrated circuit device in each process window. All the devices on each chip are identified. Vmin vs. process-bin mean and sigma sensitivity is calculated using information about specific integrated circuit devices. The voltage that generates the minimum voltage (Vmin) for the specific integrated circuit devices is identified for each process window. Vmin is a minimum voltage needed for functionality of each element at design maximum and minimum operating speeds for the integrated circuit device. Power is evaluated at the slow end and fast end of each process window using the voltage necessary to support the system frequency (Fsys). The highest power (Pmax) is determined. The maximum voltage (Vmax) for each process window that generates the highest power (Pmax) is determined. A voltage is identified between the minimum voltage (Vmin) and the maximum voltage (Vmax) that maximizes the timing margin for the system frequency (Fsys) while minimizing the risk for the highest power (Pmax). The chips are sorted into different process windows, based on the voltage identified between the minimum voltage (Vmin) and the maximum voltage (Vmax).

Also disclosed herein is a system for optimizing selective voltage binning (SVB). The system includes a processor, a tester operatively connected to the processor, and a performance monitor operatively connected to the processor. The processor determines the minimum operating voltage and hardware variations for each device in an integrated circuit design and divides a process distribution for chips manufactured from an identical circuit design into process windows, using the performance monitor. Each process window is associated with a corresponding performance range and minimum voltage. The processor establishes bin-specific voltage limits for each supply voltage based on the integrated circuit design for each process window. The bin-specific voltage limits are a maximum voltage (Vmax) and minimum voltage (Vmin) to support performance at system frequency (Fsys) for the integrated circuit device in each process window. The tester identifies all the devices on each chip and calculates Vmin vs. process-bin mean and sigma sensitivity using information about specific integrated circuit devices. The processor identifies the voltages for each process window that generates Vmin for the specific integrated circuit devices. Vmin is a minimum voltage needed for functionality of each element at design maximum and minimum operating speeds for the integrated circuit device. The processor evaluates power at the slow end and fast end of each process window using the voltage necessary to support the system frequency (Fsys) and determines the highest power (Pmax), using the performance monitor. The processor determines the maximum voltage (Vmax) for each process window that generates the highest power (Pmax). The processor identifies a voltage between Vmin and Vmax that maximizes the timing margin for system frequency (Fsys) while minimizing the risk for the highest power (Pmax). The processor sorts the chips into different process windows, using the tester, based on the voltage identified between Vmin and Vmax. Each of the process windows has a bin-specific voltage limit such that the bin-specific voltage limit for all the integrated circuit devices in a given process windows is set consistent with application conditions for the integrated circuit devices.

BRIEF DESCRIPTION OF THE SEVERAL VIEWS OF THE DRAWINGS

The devices and methods herein will be better understood from the following detailed description with reference to the drawings, which are not necessarily drawn to scale and in which.

DETAILED DESCRIPTION

Figures 1, 2, 3:
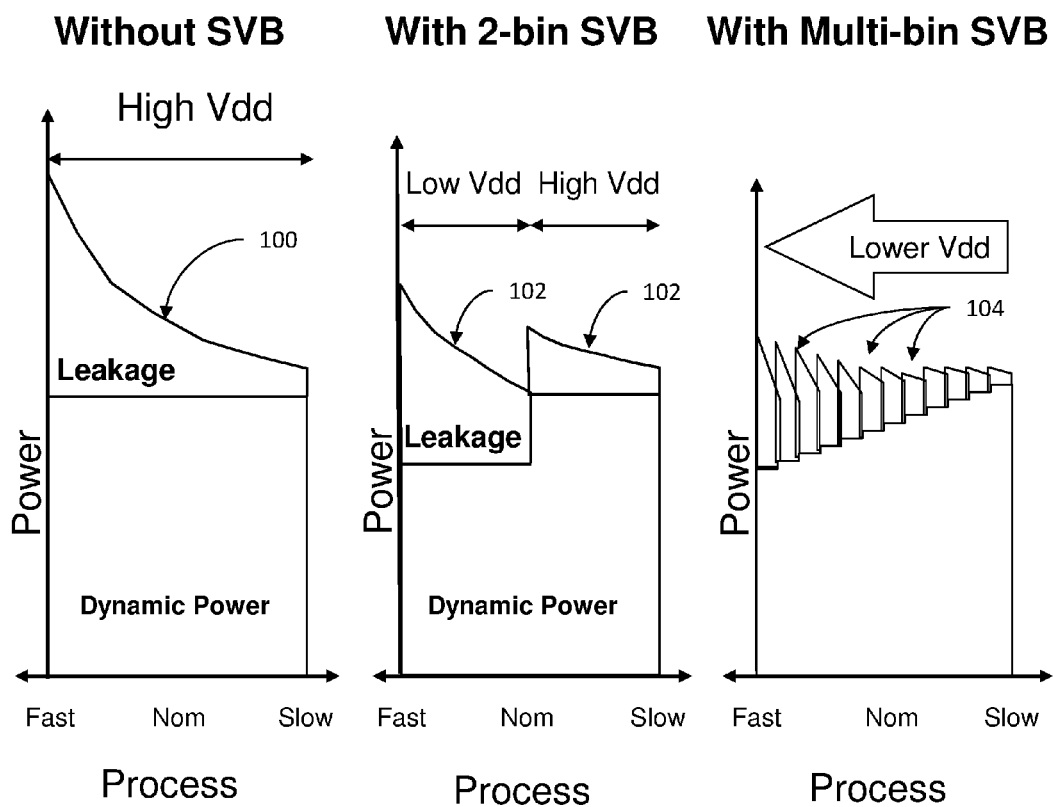
FIG. 1 is a chart illustrating the relationship between process speed and power usage for integrated circuits manufactured with the same process.
FIG. 2 is a chart illustrating the relationship between process speed and power usage for integrated circuits manufactured with the same process using a 2-bin selective binning process.
FIG. 3 is a chart illustrating the relationship between process speed and power usage for integrated circuits manufactured with the same process using a multi-bin selective binning process.

For a general understanding of the features of the disclosure, reference is made to the drawings. It will be readily understood that the devices and methods of the present disclosure, as generally described and illustrated in the drawings herein, may be arranged and designed in a wide variety of configurations in addition to the devices and methods described herein. In the drawings, like reference numerals have been used to identify identical elements. While the disclosure will be described hereinafter in connection with specific devices and methods thereof, it will be understood that limiting the disclosure to such specific systems and methods is not intended. Thus, the following detailed description of the devices and methods, as represented in the drawings, is not intended to limit the scope defined by the appended claims. On the contrary, it is intended to cover all alternatives, modifications, and equivalents as may be included within the spirit and scope of the disclosure as defined by the appended claims.

As mentioned above, the process of selective voltage binning can run faster parts at lower voltage and slower parts at higher voltage, in order to reduce the maximum power for the distribution of parts. However, conventional selective voltage binning assumes a certain non-changing performance/current leakage relationship, which may not always be correct. Indeed, some large variation in current leakage can occur. Because of this, customers are often advised that the binned devices may not precisely operate within their specific bin classification and, instead, each is provided with a +/− bin variation range (e.g., +/−3 bins). The embodiments described below address this issue and are able to supply binned devices that are guaranteed to operate within their specific voltage bin (without requiring a bin variation range).

FIG. 1 is a chart illustrating the relationship between process speed and power usage for identically manufactured integrated circuit devices. FIG. 2 is a chart illustrating the relationship between process speed and power usage for integrated circuits manufactured with the same process using a 2-bin selective binning process, and FIG. 3 is a chart illustrating the relationship between process speed and power usage for integrated circuits manufactured with the same process using a multi-bin selective binning process.

Post-manufacturing voltage binning is a technique that is used to assign manufactured chips to bins based on whether they were fabricated at either the "slow" end or the "fast" end of a process distribution, and to vary the voltage requirements for the chips depending upon the bins they are assigned to in order to reduce maximum chip power. For example, FIG. 1 is a diagram illustrating the dynamic power and process speed for chips that are manufactured from a common design, but that are different because of different processing conditions that occur within acceptable manufacturing tolerances. Bins are assigned by measuring a PSRO or other performance structure in the die and recording an identifier corresponding to the segment of the process window distribution in fuses or other structures that will be measured in system to assign operating voltage for that particular packaged chip.

In FIG. 1, the worst-case process range on curve 100 drives the required voltage for ultimately running the chip, creating an unnecessarily high operating voltage. However, with selective voltage binning shown in FIGS. 2 and 3, every chip is tested to measure operating speed and the chips are sorted into voltage bins accordingly. This reduces maximum chip power by running fast process chips at lower Vdd, as shown by curves 102 and 104. Thus, the devices are binned by process, and slow chips are operated at normal Vdd without change to slow-corner voltage, timing, and power (because slow-corner power is not limiting). However, as shown in FIGS. 2-3, fast chips are operated at reduced Vdd because the fast chips have speed to spare, and, at reduced Vdd, power is reduced.

For example, in a process-voltage-temperature space, the temperature and voltage of the chip may be fixed, and the leakage may be measured. If the leakage is above a specific cut point, then the chip is on the fast end of the process-voltage-temperature space and placed in a fast chip bin. If the leakage is below the cut point, then the chip is on the slow end of the process-voltage-temperature space and placed in a slow chip bin. The fast devices will be sorted into the "fast" bin, and will be utilized at lower voltages than the slow devices that are sorted into the "slow" bin. Because the fast devices have more leakage, the fast devices will consume more power. After the chips are sorted into bins according to the cut point, an optimal supply voltage (Vdd) for operating the chips in each bin is determined. Since both dynamic power consumption and static power consumption are exponentially proportional to the Vdd, a reduction in the required Vdd will reduce both dynamic and leakage power consumption and, thus, overall power consumption.

Selective voltage binning (SVB) procedures typically use several performance screen ring oscillator (PSRO) measurements to quantify chip performance after manufacturing. Voltage binning of individual integrated circuit devices is achieved by operating the integrated circuits at a plurality of required clock frequencies, and, for each of those frequencies, determining the minimum supply voltage level that produces a pass result for a series of applied test vectors. The bin voltage establishes a minimum voltage needed for performance of the integrated circuit device at normal operating conditions. Since this is done at a known voltage and temperature, the PSRO measurements are essentially a statement of the aggregate effect of a wide variety of different parameters upon that circuit. However, different types of circuits are typically present within a single chip, and some of these different types of circuits will exhibit different sensitivities to the variety of parameters. Thus, if a PSRO or some set of sample/reference logic paths are used to determine the bin voltage, there will likely be some circuits that inevitably track differently such that they are at a slightly different point in their best-case to worst-case performance range.

As mentioned above, the relatively-fast integrated circuit devices consume more power than the relatively-slow integrated circuit devices. The relatively-fast integrated circuit devices can be operated at a lower voltage to keep their operating speed and power consumption approximately equal to the relatively-slow integrated circuit device. Large cores, however, such as processors and logic devices, must be functional at system conditions. The method, according to embodiments herein, establishes a bin-specific voltage limit for each of the voltage bins needed for core performance at system use conditions. A core is a collection of integrated circuit elements (i.e. an embedded processor, a graphic processor, ADC, DAC, high-speed SERDES or PHY interface), designed to meet a designated specification, including performance, such as Fmax.

The required voltage relationship to the actual performance monitor, which is used for selective voltage binning, may vary due to different voltage thresholds of the library components or custom design layouts that are different as compared to standard cells or to local layout effects or variations in manufacturing line parametric centering from the assumptions used in timing. Setting the bin voltage with only PSRO information can result in functionality issues. A standard cell library is a collection of low-level logic functions such as AND, OR, INVERT, flip-flops, latches, and buffers. These cells are realized as fixed-height, variable-width, full-custom cells. One aspect of such libraries is that they are of a fixed height, which enables them to be placed in rows, easing the process of automated digital layout. The cells are typically optimized full-custom layouts, which minimize delays and area.

A planned integrated circuit design as disclosed herein includes a plurality of library circuit elements organized by circuit types. A library element is defined as a set of devices (i.e. transistors, diodes, resistors, capacitors, and inductors) wired together in a circuit, which performs a function. A circuit type is a set of library elements that have a common sensitivity to random defects. In the present disclosure, common sensitivity is defined by normalization factors, so library elements within a circuit type either have the same normalization factor or have normalization factors within a predetermined range of each other. Large library elements, such as cores, are composed of smaller and less complex library elements and can be represented by referencing the smaller and less complex library elements. Library elements of a given integrated circuit design share a common technology, one aspect of which is common minimum ground rules. Minimum ground rules define the smallest line widths and spaces or shapes that the devices may have.

As described above, one of the advantages of selective voltage binning is to reduce maximum chip power by running fast process chips at lower Vdd. Slow chips can be operated at normal Vdd; however, since fast chips have speed to spare, the fast chips can be operated at reduced Vdd. At reduced Vdd, the power consumption is reduced. Using this concept, multiple voltage bins enable lower ranges of Vdd on the fastest parts. This lowers the maximum power consumption.

One technique for defining the full process distribution for the IC chip design can be performed prior to actually manufacturing any IC chips according to IC chip design. In this case, a best case/worst case (or 'fast/slow') analysis of the specific IC chip design can be performed given the design layout. Such a best case/worst case analysis can be performed, for example, by performing a Statistical Static Timing Analysis (SSTA). In a SSTA a single timing run may be performed in a parameterized fashion over a multi-dimensional process space to model process and environmental variations. Specifically, IC gate responses to varying conditions can be captured in the timing models during library characterization using detailed Simulation Program with Integrated Circuit Emphasis (SPICE) simulation models, which accurately predict IC device physics over a range of process and environmental conditions. In addition to modeling process and environmental variations, which are typically assumed to be constant across any single IC chip (often referred to as 'chip-to-chip variation'), a SSTA can also consider Systematic and Random Across Chip Variation (ACV), which accounts for both the systematic variation between devices that increases with spatial separation, as well as the uncorrelated random variation that can exist between even neighboring devices as a result of, for example, line width variation, random dopant fluctuation, etc. The chip-to-chip process and environmental variations are assumed to be constant for a given chip (e.g., if gate A is operating at fast process, all other gates on the same chip are also operating at fast process) and the purpose of modeling chip-to-chip variation is primarily to ensure that as chips are manufactured and operate over a varying set of process and environmental conditions, sufficient functioning chips are manufactured to result in an acceptable yield. In contrast, the modeling of ACV variation is more concerned with ensuring that all chips at any given process point are functional in the presence of ACV. This is often achieved using a concept of "Early" and "Late" timing. To ensure functional hardware, the clock and data signals must be synchronized such that the data does not arrive at a latching element too early relative to the clock and be latched into the incorrect clock cycle (a 'hold fail'). Similarly, the data signal also should not arrive too late and miss the intended latching clock signal (a "setup fail"). This is ensured by assuming the ACV variation results in the earliest possible arrival time for data signals and the latest possible arrival time for clock signals for hold tests, and vice versa for setup tests. The ACV data itself may be modeled, in order of increasing accuracy, using scalars (e.g., early/late are modeled as −/+5% of nominal, to provide a trivial example), as linear combinations of existing characterized data, or via direct characterization of ACV from SPICE. It should also be noted that the ACV conditions themselves can vary as a function of chip-to-chip Process and Environmental variation; e.g., the split between an Early and Late delay for a given piece of IP can vary significantly between fast and slow Process. In summary, the SSTA timing models accurately predict chip-to-chip best case/worst case process and environmental variation, as well as 'Early/Late' across chip variation, typically obtained from SPICE based transient simulation.

Figure 4:
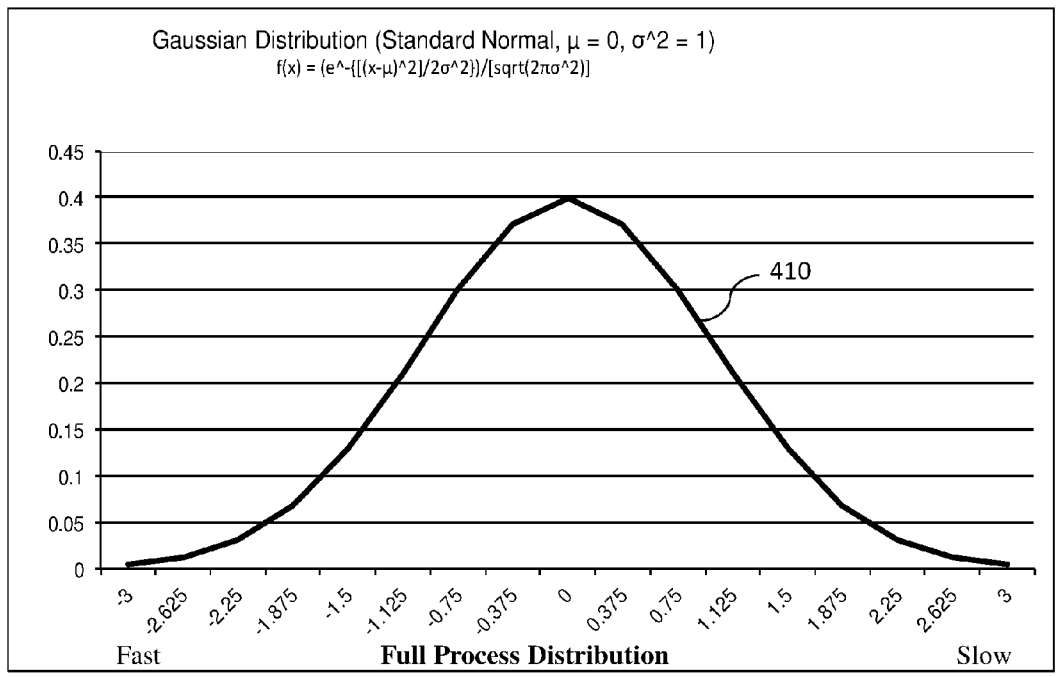
FIG. 4 is a graph illustrating an exemplary full process distribution for an IC chip design.

Based on the results of the best case/worst case analysis, a full process distribution for the IC chip design can be generated and stored in the memory. FIG. 4 is a graph illustrating an exemplary full process distribution 410 for an IC chip design. This full process distribution 410 represents the predicted performance range for IC chips that would be manufactured according to the design layout and operated using a specific supply voltage and at a specific operating temperature. The specific supply voltage and the specific operating temperature can be the target supply voltage and the target operating temperature for the technology node (e.g., a 45 nm, 32 nm, 22 nm, 14 nm, 45 nm SOI, 32 nm SOI, 22 nm SOI, etc.) within which the IC chip is being designed. The predicted performance range can extend from IC chips with relatively fast operating speeds (e.g., −3 σ fast IC chips) at one end of the full process distribution (i.e., the "fast" end of the process distribution) to IC chips with relatively slow operating speeds (e.g., 3 σ slow IC chips) at the opposite end of the full process distribution (i.e., the "slow" end of the process distribution).

Another technique for defining the full process distribution for the IC chip design can be performed following manufacturing IC chips according to IC chip design. In this case, performance testing can be performed using a specific supply voltage and a specific operating temperature and the full process distribution can be defined based on the results of the performance testing.

Figure 5:
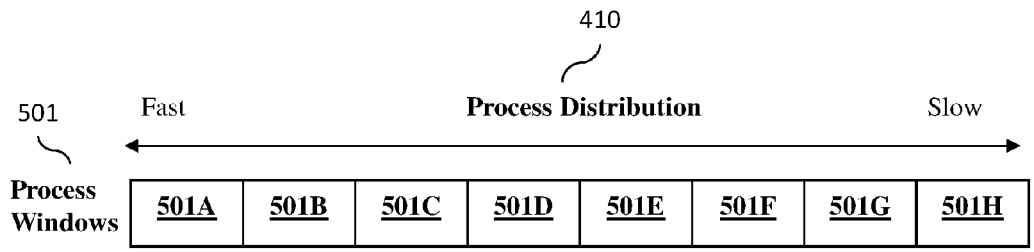
FIG. 5 illustrates the process distribution of FIG. 4 divided into different process windows.

In any case, after the process distribution 410 is defined, it can be divided into some number (M) of process windows (i.e., into some number (M) of successive intervals) from the fast end of the process distribution 410 to the slow end of the process distribution 410. For illustration purposes, FIG. 5 shows the process distribution 410 divided into eight different process windows 501 from process window 501A at the fast end of the process distribution 410 to process window 501H at the slow end of the process distribution 410. FIG. 5 also shows that the process windows 501 are essentially uniform. That is, in FIG. 5, the process windows 501A-H each encompasses the same number of units of sigma. However, it should be understood that the use of eight uniform process windows is for illustration purposes only and that the number of process windows and/or the number of units sigma per process window may vary from process window to process window. In any case, each process window 501A-H can be associated with a corresponding performance range (e.g., a minimum delay to a maximum delay) and each process window 501A-H can also be associated with a corresponding supply voltage range and, particularly, a minimum supply voltage and a maximum supply voltage. Specifically, different voltage ranges can be assigned to the different process windows 501A-H such that relatively low voltage ranges are assigned to process windows at the "fast" end of the process distribution to optimize power consumption and relatively high voltage ranges are assigned to process windows at the "slow" end of the process distribution to optimize performance.

In addition to different performance ranges and different voltage ranges, the process windows can also be associated with different leakage power ranges. Leakage power refers to the amount of power consumed by an IC chip when it is inactive and leakage power is proportional to the value of the supply voltage (Vdd) and to the leakage current. Models for leakage power can be generated for each of the process windows 501A-H. The leakage power ranges can vary from process window to process window and, more specifically, these leakage power ranges can become tighter from the fast end of the process distribution to the slow end of the process distribution. For example, process window 501A at the fast end of the process distribution can have a leakage power range of 20 mA-80 mA, process window 501B can have a tighter leakage power range of 15 mA-65 mA, and so on. Finally, process window 501H at the slow end of the process distribution can have the tightest leakage power range of 5 mA-10 mA.

IC chips can be manufactured according to the IC chip design and, particularly, can be manufactured based on the IC design layout generated as a result of the physical design processes. Once manufactured, the chips can be tested and assigned to specific voltage bins based on performance. Typically, the voltage change from one bin to the next is a linear step change. However, each voltage bin includes a margin that ensures that all VT types meet the maximum and minimum timing delay. A non-linear voltage bin definition allows more margin for nominal bins, while maintaining the same performance and power.

Figure 6:
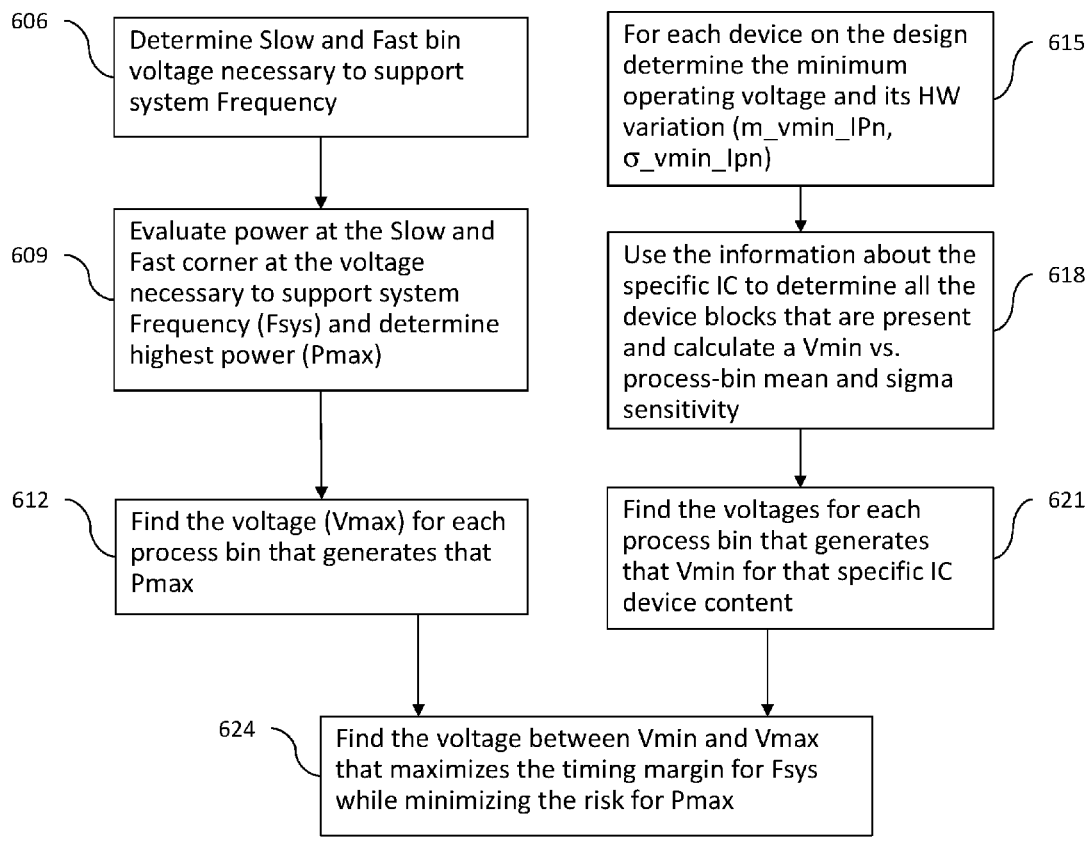
FIG. 6 is a flow diagram illustrating a method for performing selective voltage binning (SVB) according to devices and methods herein.

Referring to FIG. 6, at 606, the slow bin voltage and fast bin voltage necessary to support the desired system frequency is determined. At 609, the power at both the slow corner and the fast corner of the bin is evaluated at the voltage necessary to support the system frequency (Fsys). The highest power is determined for that voltage. At 612, the maximum voltage (Vmax) that generates the maximum power (Pmax) for each process bin is determined. Meanwhile, at 615, the minimum operating voltage (Vmin) and its hardware variation (m_Vmin_IPn, σ_Vmin_lpn) are determined for each device on the design. Using the information about the specific integrated circuit in the design, at 618, all the device blocks are evaluated and Vmin vs. process-bin mean and sigma sensitivity is calculated. At 621, the voltages for each process bin that generates that Vmin for that specific integrated circuit device content is found. At 624, a voltage is found between the maximum voltage (Vmax) that generates the maximum power (Pmax) and the minimum operating voltage (Vmin). The found voltage maximizes the timing margin for the system frequency (Fsys) while minimizing the risk for maximum power (Pmax).

Figure 7:
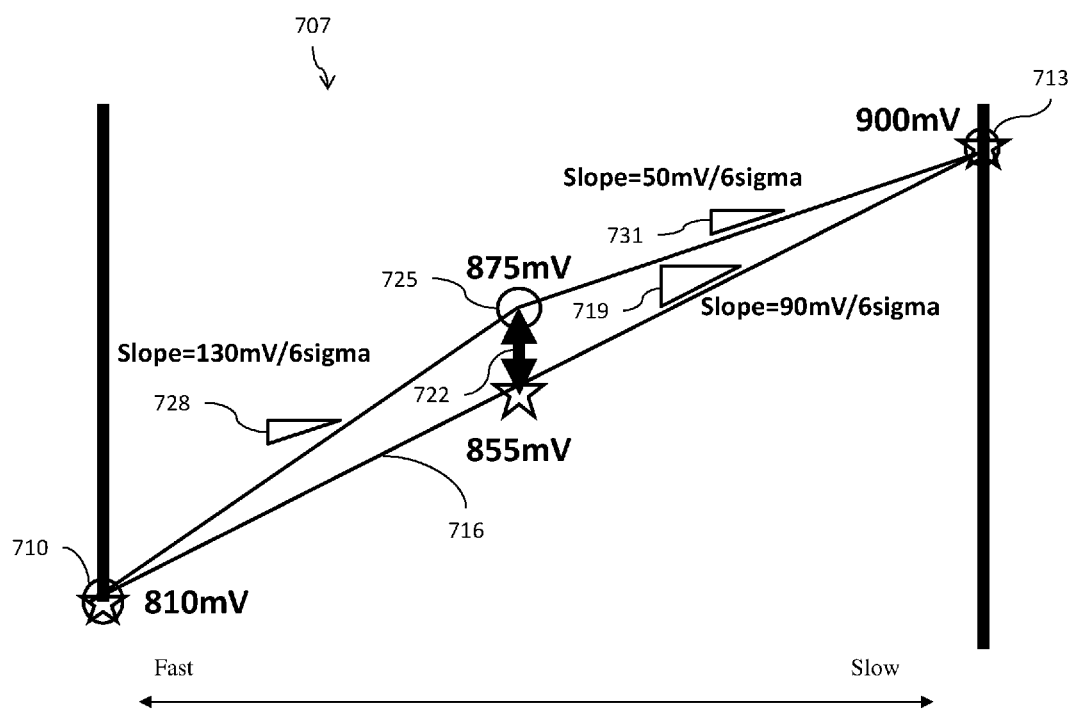
FIG. 7 illustrates a timing solution for a non-linear voltage binning process.

FIG. 7 shows a comparison of a linear timing solution that allows for additional timing margin at the nominal process. A process window (or bin) is shown generally at 707. The process window has a minimum operating voltage (Vmin) 710 (e.g., 810 mV) that supports a given system frequency and a maximum voltage (Vmax) 713 (e.g., 900 mV) that generates the maximum power (Pmax). The max voltage slope supported by all devices on the chip is shown at 716. The slope is determined between Vmin 710 and Vmax 713. In the example shown in FIG. 7, the max voltage slope 716 is 90 mV/6sigma (indicated at 719). Other slopes can be determined based on the bin dimensions. A margin 722 (e.g., 20 mV) can be defined to bound all the process points, such as 725, from all the devices in the bin 707. In the example shown in FIG. 7, the slope from Vmin 710 to process point 725 is 130 mV/6 sigma (indicated as 728) and the slope from process point 725 to Vmax 713 is 50 mV/6sigma (indicated as 731). Any shape can be used that best optimizes yield (timing and power). Note a shallower slope, such as indicated at 731, will cause an increase in power from the slow end to the fast end.

In view of the foregoing, given the customer-supplied minimum voltage at the slow end, the selective voltage binning (SVB) process achieves the minimum possible voltage on the fast end of the process window and the maximum possible voltage at the slow end of the process window.

Figure 8:
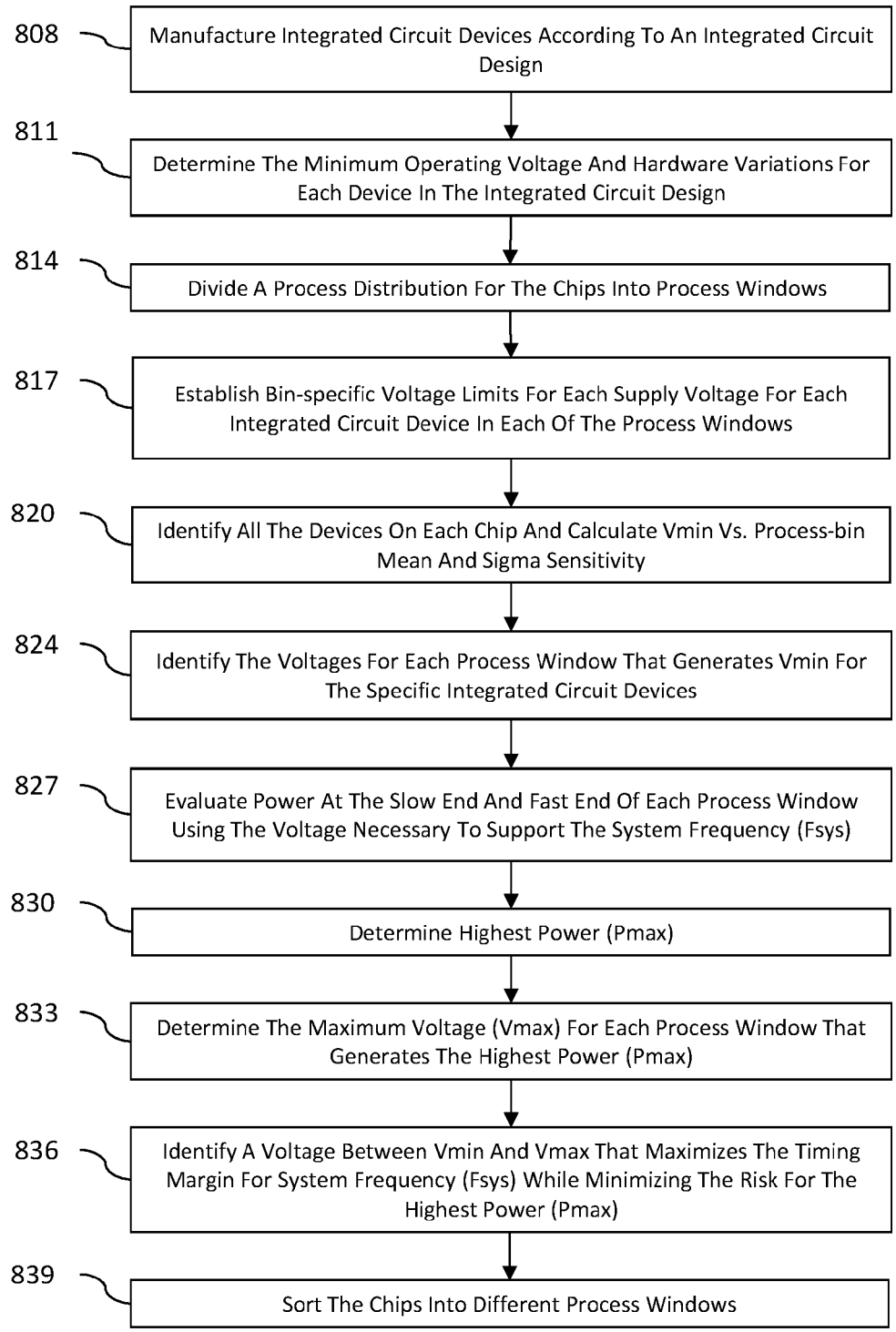
FIG. 8 is a flow diagram for performing selective voltage binning (SVB) according to devices and methods herein.

More particularly, FIG. 8 is a flow diagram illustrating a method for optimizing selective voltage binning (SVB). In the method, integrated circuit devices are manufactured, using manufacturing equipment, according to an integrated circuit design, at 808. The integrated circuit design produces integrated circuit devices that are identically designed and perform at different operating speeds caused by manufacturing process variations. At 811, the minimum operating voltage and hardware variations for each device in the integrated circuit design are determined and a process distribution for the chips is divided into process windows, at 814. Each process window is associated with a corresponding performance range and minimum voltage. For each integrated circuit device in each of the process windows, at 817, bin-specific voltage limits for each supply voltage are established. The bin-specific voltage limits are based on the integrated circuit design for each process window. The bin-specific voltage limits are a maximum voltage (Vmax) and minimum voltage (Vmin) to support performance at system frequency (Fsys) for the integrated circuit device in each process window. At 820, all the devices on each chip are identified. Vmin vs. process-bin mean and sigma sensitivity is calculated using information about specific integrated circuit devices. At 824, the voltage that generates the minimum voltage (Vmin) for the specific integrated circuit devices is identified for each process window. Vmin is a minimum voltage needed for functionality of each element at design maximum and minimum operating speeds for the integrated circuit device. At 827, power is evaluated at the slow end and fast end of each process window using the voltage necessary to support the system frequency (Fsys). At 830, the highest power (Pmax) is determined. The maximum voltage (Vmax) for each process window that generates the highest power (Pmax) is determined, at 833. At 836, a voltage is identified between the minimum voltage (Vmin) and the maximum voltage (Vmax) that maximizes the timing margin for the system frequency (Fsys) while minimizing the risk for the highest power (Pmax). At 839, the chips are sorted into different process windows, based on the voltage identified between the minimum voltage (Vmin) and the maximum voltage (Vmax).

Various on-chip and in-Kerf performance monitor structures are known in the art. One exemplary performance monitor that can be used in conjunction with this method is a performance screen ring oscillator (PSRO). Those skilled in the art will recognize that a PSRO is an on-chip structure with a ring of free-running, series-connected devices. The speed of a device under test can be determined based on the oscillation frequency of the PSRO output signal (i.e., the PSRO output signal frequency). Various PSRO structures are well known in the art and, thus, the details are omitted from this specification in order to allow the reader to focus on the salient aspects of the disclosed embodiments. Additionally, various techniques for measuring leakage power of IC chips are well known in the art. Thus, the details of such techniques are omitted from this specification in order to allow the reader to focus on the salient aspects of the disclosed embodiments.

Following completion of chip bin assignment as described above and prior to shipping out manufactured IC chips for incorporation into products, each of the methods further include a process step wherein, for each specific IC chip, the supply voltage range associated with the group (and process window) to which that specific IC chip was finally assigned is noted and accessible to product assembly facilities. For example, this supply voltage range can hard programmed onto the specific IC chip (e.g., programmed into programmable elements, such as fuses or anti-fuses, on the specific IC chip) so that it is readable at product assembly facilities.

While only one or a limited number of transistors or devices are illustrated in the drawings, those ordinarily skilled in the art would understand that many different types of transistors or other technology could be simultaneously formed with the embodiment herein and the drawings are intended to show simultaneous formation of multiple different types of devices; however, the drawings have been simplified to only show a limited number of devices for clarity and to allow the reader to more easily recognize the different features illustrated. This is not intended to limit this disclosure because, as would be understood by those ordinarily skilled in the art, this disclosure is applicable to structures that include many of each type of transistor or technology shown in the drawings.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

As described above, the present invention is a method. However, it should be understood that portions of this method (e.g., development of an initial IC design, performance of physical design processes, definition of a full process distribution for the IC design, division of the process distribution into process windows, etc.) may be implemented using a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
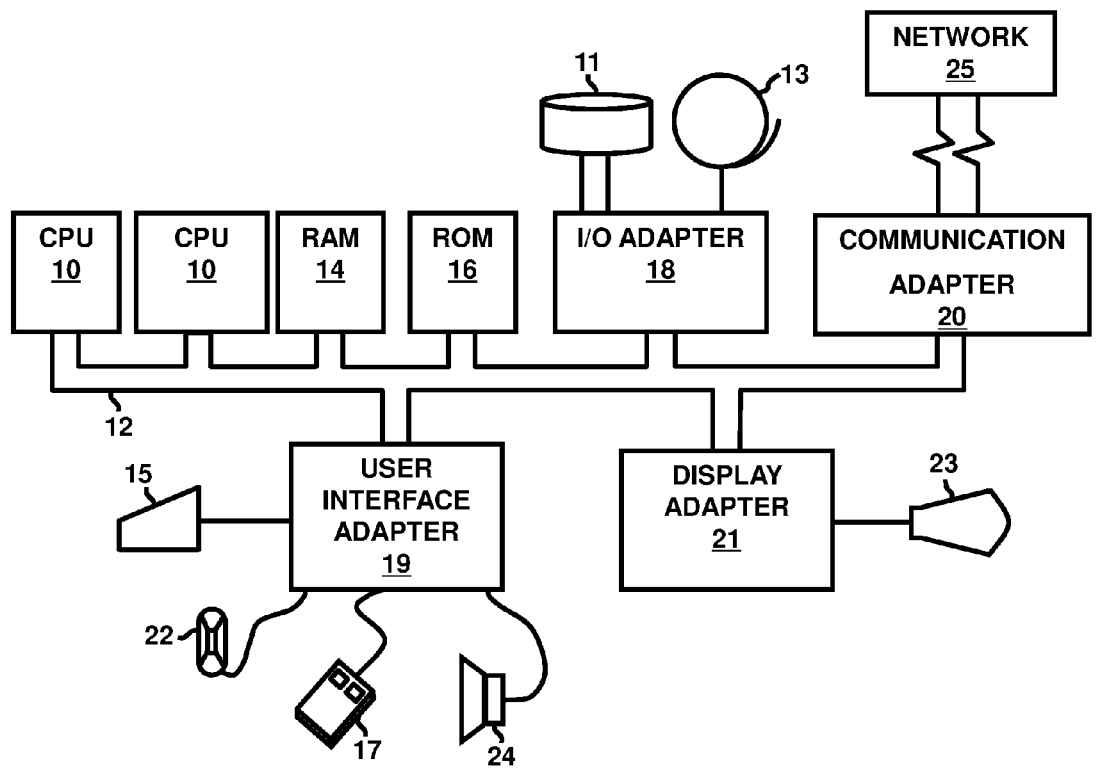
FIG. 9 is a schematic diagram illustrating a representative hardware environment for implementing the system and methods disclosed herein.

A representative hardware environment (i.e., a computer system) for implementing one or more of the processes of the method and/or a computer program product associated with these processes is depicted in FIG. 9. This schematic drawing illustrates a hardware configuration of an information handling/computer system in accordance with the embodiments herein. The system incorporates at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed embodiments and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    manufacturing chips according to an integrated circuit design;
    determining the minimum operating voltage and hardware variations for each device in the integrated circuit design and dividing a process distribution for the chips into process windows;
    determining maximum voltage (Vmax) and minimum voltage (Vmin) to support a system frequency (Fsys) in each process window, each process window being bounded by a slow end associated with Vmax and a fast end associated with Vmin;
    identifying all the devices on each chip and calculating Vmin vs. mean voltage and sigma sensitivity for each of the process windows using information about specific integrated circuit devices;
    identifying voltages for each process window that generates Vmin for the specific integrated circuit devices;
    evaluating power at the slow end and the fast end of each process window using the voltage necessary to support Fsys and determining highest power (Pmax);
    determining Vmax for each process window that generates Pmax; and identifying a voltage between Vmin and Vmax that maximizes timing margin for Fsys while minimizing risk for Pmax.

2. The method according to claim 1, further comprising:
sorting the chips into different process windows, based on the voltage identified between Vmin and Vmax.

3. The method according to claim 1, each process window being associated with a corresponding performance range and minimum voltage.

4. The method according to claim 1, further comprising:
establishing limits for the process windows for relatively-slow integrated circuit devices and relatively-fast integrated circuit devices.

5. The method according to claim 1, further comprising:
defining the process distribution using a specific supply voltage and at a specific operating temperature.

6. The method according to claim 1, further comprising:
establishing voltage limits comprising design limits and limits based on empirical testing at operating conditions for each of the process windows.

7. The method according to claim 1, manufacturing chips according to an integrated circuit design further comprising:
manufacturing integrated circuit devices using manufacturing equipment producing integrated circuit devices that are identically designed and perform at different operating speeds caused by manufacturing process variations.

8. The method according to claim 1, further comprising:
for each integrated circuit device in each of the process windows, establishing specific voltage limits for each supply voltage for each of the process windows based on the integrated circuit design.

9. The method according to claim 1, Vmin for the specific integrated circuit devices being a minimum voltage needed for functionality of each element at design maximum and minimum operating speeds for the integrated circuit device.

10. A method, comprising:
manufacturing integrated circuit devices according to an integrated circuit design using manufacturing equipment, the integrated circuit design producing integrated circuit devices that are identically designed and perform at different operating speeds caused by manufacturing process variations;
determining the minimum operating voltage and hardware variations for each device in the integrated circuit design and dividing a process distribution for the integrated circuit devices into process windows;
for each integrated circuit device in each of the process windows, establishing bin-specific voltage limits for each supply voltage based on the integrated circuit design for each process window, the bin-specific voltage limits being a maximum voltage (Vmax) and minimum voltage (Vmin) to support performance at system frequency (Fsys) for the integrated circuit device in each process window, each process window being bounded by a slow end associated with Vmax and a fast end associated with Vmin;
identifying all the devices on each integrated circuit devices and calculating Vmin vs. mean voltage and sigma sensitivity for each of the process windows using information about specific integrated circuit devices;
identifying voltages for each process window that generates Vmin for the specific integrated circuit devices, Vmin being a minimum voltage needed for functionality of each element at design maximum and minimum operating speeds for the integrated circuit device;
evaluating power at the slow end and the fast end of each process window using the voltage necessary to support the system frequency (Fsys) and determining highest power (Pmax);
determining the maximum voltage (Vmax) for each process window that generates the highest power (Pmax); and
identifying a voltage between Vmin and Vmax that maximizes timing margin for system frequency (Fsys) while minimizing risk for the highest power (Pmax).

11. The method according to claim 10, further comprising:
sorting the integrated circuit devices into different process windows, based on the voltage identified between Vmin and Vmax.

12. The method according to claim 10, each process window being associated with a corresponding performance range and minimum voltage.

13. The method according to claim 10, further comprising:
establishing limits for the process windows for relatively-slow integrated circuit devices and relatively-fast integrated circuit devices.

14. The method according to claim 10, further comprising:
defining the process distribution using a specific supply voltage and at a specific operating temperature.

15. The method according to claim 10, further comprising:
establishing specific voltage limits comprising design voltage limits and operating speed limits for each of the process windows based on empirical testing at operating conditions.

* * * * *